7928X
O. HUSSEY.
REAPER.
Patented Dec. 31, 1833.
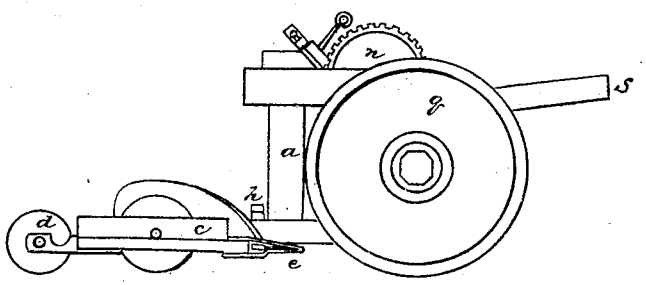
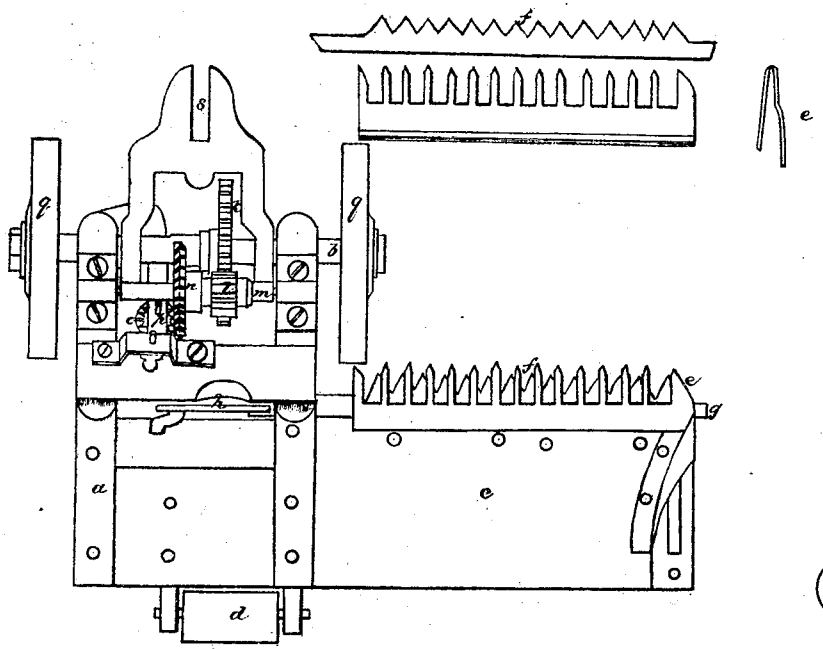

7928X

UNITED STATES PATENT OFFICE.

OBED HUSSEY, OF CINCINNATI, OHIO.

IMPROVEMENT IN MACHINES FOR REAPING AND CUTTING GRAIN.

Specification forming part of Letters Patent dated December 31, 1833.

*To all whom it may concern:*

Be it known that I, OBED HUSSEY, of Cincinnati, in the county of Hamilton and State of Ohio, have made an improvement in the useful arts, being a machine for reaping or cutting all kinds of small grain and grasses, which is described as follows, reference being had to the annexed drawings.

This machine consists of a frame, A, formed of two sills, four posts, mortised into the sills, and two short top rails parallel with the sills, with several cross-rails connecting the sills, posts, and top rails. To the two front posts is fixed the main axle *b*, on the ends of which are wheels of a convenient diameter—say three feet four inches, more or less—which run on the ground and sustain the forward part of the machine and give motion to the saw or cutters, hereinafter described, by which the grain is cut. In the rear of the machine the sills extend several feet. Across these sills, and in the rear of the wheels before mentioned, is fixed a platform, *c*, extending on one side, which, for perspicuity, we will call the "right side" of the machine. About six feet beyond the line of the right wheel the rear of the machine is sustained by a single wheel or roller, *d*, running on the ground and raising the platform about nine inches from the ground. This platform moves horizontally and is about three feet wide. On the front edge of the platform is fixed the cutting or reaping apparatus, which is constructed in the following manner: A series of iron spikes, *e*, which I will call "guards," are fixed permanently to the platform and extend seven or eight inches (more or less) beyond the edge of the platform parallel to each other, horizontal, and pointing forward. These guards are about three inches apart, of a suitable size—say three-quarters of an inch square (more or less) at the base, and lessening toward the point. These guards are formed of a top and a bottom piece, joined at the point and near the base, lying nearly parallel and about one-eighth of an inch apart, forming a horizontal mortise or slit through the guard. These mortises, being on a line with each other, form a continued range of openings or slits through the guards. The first guard is placed on the rear of the right wheel and the last at the extreme end of the platform and the intermediate guards at equal distances from each other and three inches apart (more or less) from center to center. The cutters or saw *f* is formed of three triangular plates of steel, fastened to a straight flat rod, *g*, of steel, iron, or wood, one inch and a half wide. These steel plates are arranged side by side, forming a kind of saw, with teeth three inches at their base and four and a half inches long, more or less, sharp on both sides, and terminating nearly in a point. The saw is then passed through all the guards in the aforesaid range of mortises, the size of the mortises being suited to receive the saw with the teeth pointing forward, observing always that the points of the saw-teeth should correspond with the centers of the guards. One end of the saw is connected with a pitman, *h*, which pitman is moved by a crank, *i*, receiving its motion from the main axis by one or two sets of cog-wheels. The vibration of the crank must be equal to the distances of the centers of the guards or the points of the saw-teeth, or thereabout, so that when the machine is in motion the point of each saw-tooth may pass from center to center of the guards on each side of the same tooth at every vibration of the crank. If the main wheels are three feet four inches in diameter, they should in one revolution give the crank sixteen revolutions, more or less. The saw-teeth should play clear of the guards both above and below. When the machine is extended to a large size the platform should be cut off between the right sill and the first guard and immediately behind the right wheel, and the two parts being secured together by hinges or otherwise and a small wheel placed under the extreme end of the platform to sustain its weight. In the operation of this machine the guards form double bearers to assist the saw-teeth. The wheel or roller *d*, which sustains the back part of the machine, is hung in a frame and arranged in such manner as to operate on the principle of a common caster, capable of being fixed permanently in such position as to alter the machine should it be found at any time to incline to the right or left while in use.

Operation: The power is given by locking the wheels to the main axis. The machine has one square wheel-box, the other round and locked at pleasure, if the power should be wanted. One or two or more horses are attached and driven on the stubble before the machine, the right wheel running near the standing grain. The platform, with the saw on its front edge, extends on the right at right angles with the direction of the horses, with the guards and saw-teeth presented to the standing grain. When the machine moves forward the saw moves with the teeth endwise and horizontal. The grain or grasses are brought between the guards. The saw-teeth, in passing through the guards, cut off the stalk while held both above and below the saw. The butts of the grain receive an impulse forward by the motion of the machine while in the act of being cut, which causes the heads of the grain to fall directly backward onto the platform. In this manner the platform receives the grain until a sufficient quantity is collected to make one or more bundles, according to the pleasure of the operator. Then it is deposited with a proper instrument by the operator, who may ride on the machine.

The following are the dimensions of a machine suited for two horses: The sills, top rails, and cross-rails are three by four inches square, of oak; the post three by five inches, of oak. The planks for the platform are one and a half inch thick, of good pine or other suitable material; the platform formed of two or more piece in width, secured together with battens. The sills are about seven feet long; the top rails about three and a half feet long. The posts are framed about two feet apart from outside to outside, and from the under side of the sill to the top side of the top rail is about two feet three inches, and the whole, when connected by the cross-rails, to be about three feet six inches wide from outside to outside of the sills. The back ends of the sills may extend about three feet seven inches in the rear of the hind posts. A space of three feet, or thereabout, will be occupied by the platform, bringing the front edge of the platform seven inches behind the foot of the rear post, so that the points of the saw-teeth may be nearly on a line with the back part of the posts. The main shaft may be two inches in diameter, of wrought-iron, and hung to the forward side of the posts, with journals fitted to boxes bolted to the posts. Near the middle of this shaft is a spur-wheel, *k*, about two feet in diameter, of cast-iron, which plays into a pinion, *l*, of six inches in diameter on a second shaft, *m*, which is hung on the top rails. On this second shaft is a bevel-wheel, *n*, of about sixteen inches in diameter, playing into a pinion, *o*, of about four inches diameter, on the crank-shaft *p*. This shaft is at right angles with the second shaft and placed in an inclined position, so that the lower end of the shaft may turn in a step on such part of the platform as to admit the crank I nearly on a line with the back of the saw in order to admit a fair operation of the pitman, and the upper end is so hung that it may be ungeared at pleasure. The main wheels Q may be made similar to coach-wheels, but wide on the tread—say about three inches, and about three feet four inches diameter—the hubs about seven inches long and the same in diameter; the rear wheel of any size from one to two feet diameter. The back of the saw may be from one inch to one and a half inch wide and from three-sixteenths to one-quarter of an inch thick, and the steel plates for the teeth should be about one-tenth of an inch thick. One end of the mortise in the guard should be fitted to receive the back of the saw, so that the bearing may be on the back of the saw only. A tongue may be fitted in the mortise S, similar to that of a wagon. These dimensions may be varied to suit the convenience of the constructer.

In this machine the following points are claimed as new and original:

1. The straight horizontal saw with the teeth sharp on their two sides for cutting grain.
2. The guards forming double bearers above and below the saw, whereby the cutting is made sure, whether with a sharp or a dull edge, the guards at the same time protecting the saw from rocks or stones or other large substances it may meet with.
3. The peculiar construction that the saw-teeth may run free, whereby the necessary pressure and consequent friction of two corresponding edges cutting together as on the principle of scissors are entirely avoided.
4. The peculiar arrangement by which the horses are made to go before the machine, being more natural and greatly facilitating the use of the machine, and the general arrangement of the parts, as above described.
5. In cutting grass the platform is reduced in width and the grass falls on the ground as it is cut.

OBED HUSSEY.

Witnesses:
JOTHAM LINCOLN.
HENRY DIBBLE.